United States Patent [19]
Coale

[11] 3,708,117
[45] Jan. 2, 1973

[54] VEHICLE TRACTION TRACK
[76] Inventor: Sidney C. Coale, 3144 Middlebelt Road, Orchard Lake, Mich. 48033
[22] Filed: July 27, 1970
[21] Appl. No.: 58,542

[52] U.S. Cl. .................................. 238/14, 52/660
[51] Int. Cl. .................... B62d 55/08, E01b 23/00
[58] Field of Search ........ 238/14; 152/210, 187, 188; 52/660, 674

[56] References Cited

UNITED STATES PATENTS

| | | | |
|---|---|---|---|
| 3,289,939 | 12/1966 | Martinov | 238/14 |
| 3,425,624 | 2/1969 | Jacobs | 238/14 |
| 3,350,013 | 10/1967 | Bergquist | 238/14 |
| 3,202,358 | 8/1965 | Griswold | 238/14 |
| 3,152,761 | 10/1964 | Vaughan, Jr. et al. | 238/14 |
| 1,650,254 | 11/1927 | Zesinger | 238/14 |

Primary Examiner—Drayton E. Hoffman
Assistant Examiner—Richard A. Bertsch
Attorney—Russel C. Wells

[57] ABSTRACT

A portable vehicle traction track for freeing vehicles from ice and/or snow without having to raise the vehicle wheel. An extending smooth-bottom tongue contiguous to one end of the track permits easy insertion at the juncture of the tire and the snow. Rotating action of the tire against the upper abrasive surface of the tongue then pulls it completely under the tire. Further movement of the track is prevented by a plurality of grippers on the bottom surface of the track coming to the point where the vehicle weight is pressing them into the snow. The tire then moves along the surface of the track, out of the depression in which it previously rested.

1 Claim, 6 Drawing Figures

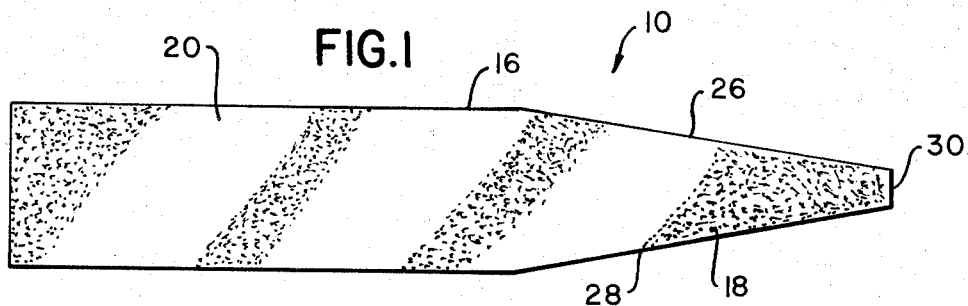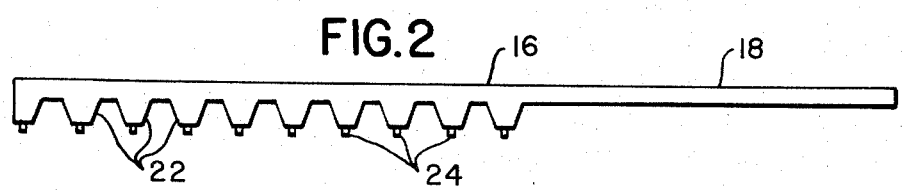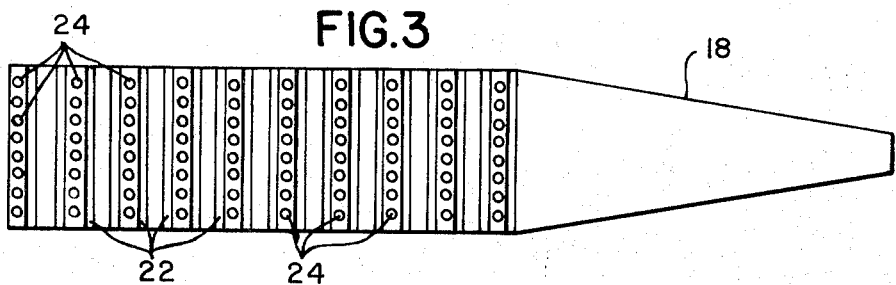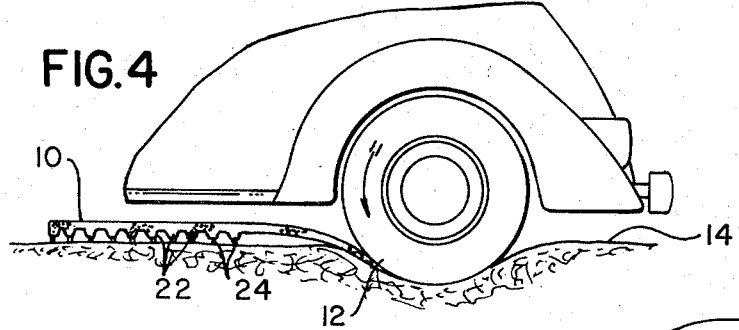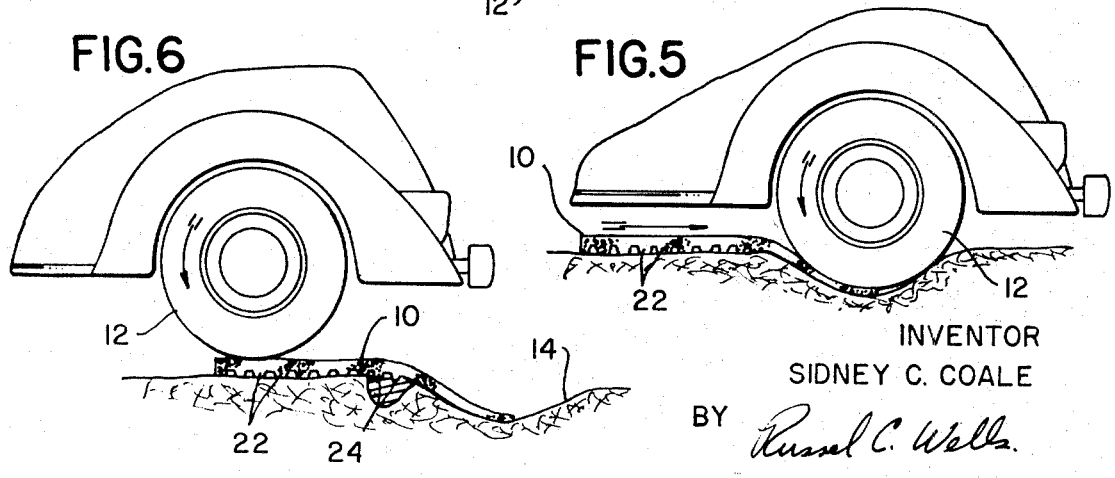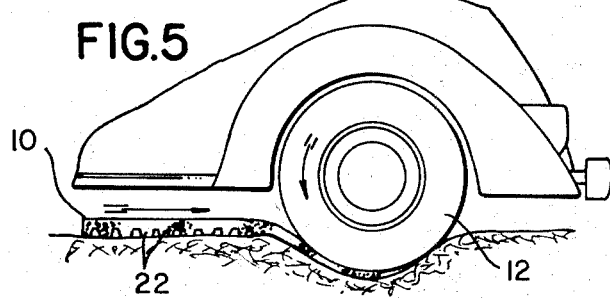
INVENTOR
SIDNEY C. COALE
BY Russell C. Wells
ATTORNEY

VEHICLE TRACTION TRACK

BACKGROUND OF INVENTION

1. Field of Invention

This invention relates to traction devices in general and more particularly to a flexible rubber track for use with motor vehicle wheels.

2. Prior Art

Prior art devices include a canvas constructed plank having a plurality of steel rods disposed in a spaced apart relationship transverse to the direction of the length of the plank. The rods extend from one end of the canvas plank to the other end and apparently in cooperation with the canvas afford a traction surface which is only slightly better than the snow or ice upon which it lies. Another prior art device, attempts to improve traction between the wheel and the device by having a mat with a plurality of spaced apart wood tracks on the upper surface and directly below each wood track a rigid angle bar to grip into the snow or ice. The rigidity in the direction transverse to the length of the mat does not allow the mat to conform to the surface of the tire nor of the hole churned in the ice, snow or ground.

In order to improve the placing of the mat under larger, low pressure tires, another mat was developed having a rigid shoe-shaped portion for engagement with the tire. This shoe-shaped portion had a plurality of very small grippers spaced along each side of the shoe to grip the tire. This required that the mat had to be both accurately sized to the tire and positioned under the tire which necessitated that tire be raised from the ground for positioning.

This same disadvantage of use namely, the necessity of raising the vehicle wheel, applied to still another traction pad revealed in prior art. Furthermore, it relied on an abrasive lower surface and thin herringbone strips of the basic material of the pad on the upper surface to prevent slippage of the mat in the snow and the tire on the mat.

Another device embodied a completely rigid construction including a rigid contoured lower surface. The lower surface had a plurality of wedge-shaped projections extending from one end of the mat to the opposite end of the mat and the rigid-shaped contour also required that the wheel had to be raised in order to place the mat under the tire.

SUMMARY OF INVENTION

It is a principle object of this invention to provide a portable vehicle traction track which is capable of being easily positioned between the wheel and the ice or snow without the need or requirement of lifting the wheel.

It is another object of this invention to provide a traction track which is flexible in all directions allowing the track to conform to the contour of the tire regardless of size and of the ice or snow.

It is another object of this invention to provide substantial ridges and grippers embedded in the ridges to firmly secure the mat in the surface of the ice or snow to allow the vehicle to move therealong.

In accordance with these and other objects there is provided a vehicle traction track comprising an elongated flexible member having a pair of opposed broadsides extending the length of the track. Abrasive means is fixedly attached to one of said broadsides and a plurality of spaced apart parallelly disposed flexible ridges are fixedly attached to the other of said broadsides. Embedded in each ridge are a plurality of grippers extending outwardly from each of said ridges. A trapezoidal-shaped flexible tongue having an abrasive top broadside surface and a smooth lower broadside surface is attached contiguously to one end of said member becoming an integral section thereof.

DESCRIPTION OF DRAWINGS

In the Drawings:

FIG. 1 is a plan view of the vehicle traction track;

FIG. 2 is a side view of the vehicle traction track;

FIG. 3 is a bottom view of the traction track;

FIG. 4 is an illustration of the track placed in front of a wheel of a vehicle;

FIG. 5 illustrates the rotation of the vehicle pulling the tongue under the wheel;

FIG. 6 illustrates the wheel rolling along the vehicle traction track.

DETAILED DESCRIPTION

Referring to the Figs. by the characters of reference, there is illustrated a flexible vehicle traction track 10 such as may be used to provide a traction surface between a wheel 12 of a vehicle such as an automobile and a smooth or slick slippery surface 14 such as ice and/or snow. Usually in such a situation, the vehicle wheel 12 has churned a depression in the snow by the rotational action of the wheel 12. The track 10 comprises an elongated flexible member 16 having a flexible tapered or trapezoidal-shaped tongue 18 contiguous to one end thereof. The upper broadside surface of the track has an abrasive surface 20 extending completely in the direction of elongation. The lower broadside surface is ribbed by a plurality of spaced apart ridges 22 in the area of the elongated member 16 and in the area of the tapered tongue 18 it is smooth.

In the preferred embodiment, the traction track is molded from a flexible rubber material and has a plurality of spaced apart tire cords, such as those found in tire construction, extending in the direction of elongation for added strength. The upper broadside surface 20 is completely covered by an abrasive material such as large-grain sharp sand or other similar material which is embedded in the surface. In the alternative, an abrasive sheet material may be bonded to the upper broadside surface of both the member 16 and the tongue 18.

Extending along the lower broadside surface of the elongated member 16 only of the vehicle traction track 10 are a plurality of spaced apart ridges 22. The ridges 22 which are substantially parallel to each other extend transversely to the direction of elongation of the track 10. Embedded in each individual ridge 22 are a plurality of spaced apart metal grippers 24 or studs, such as commonly found on snow tires. Each gripper 24 extends outwardly from the surface of the ridge and grips or penetrates the hard packed snow or ice 14 upon which it lays to prevent slipping of the track.

Extending away in the direction of length from and contiguous to one end of the elongated member 16, is a tapered tongue 18, formed of a flexible material and may be the same material as is the elongated member 16. The upper broadside surface of the tongue 18 has an abrasive coating as does the elongated member 16; however, the lower broadside surface of the tongue is smooth. The general shape of the tongue is a trapesoid with one side coincident with the end of the elongated member 16 and both of the elongated sides 26 and 28 tapering or converging toward each other terminating along the fourth side 30.

Operation

Referring to FIGS. 4 and 5, and 6 there is graphically illustrated one mode of operation of the vehicle traction track 10. When a vehicle, such as an automobile is stopped on a slippery surface 14 such as packed snow or ice, the wheel 12 resting on the slippery surface sometimes may not be able to gain enough traction so as to move the vehicle. Instead, it may churn down into the snow and/or ice creating a deep depression. In order for the vehicle to move, some means such as the vehicle traction track 10 must be used to provide the necessary traction to allow the wheel to escape the depression.

As illustrated in FIG. 4, the vehicle traction track 10 is placed with the fourth side 30 of the tongue portion 18 pushed tightly against the wheel 12 and slightly into the space between the wheel and the snow. Since the bottom broadside of the tongue is smooth, the wheel need not be lifted from the surface of the ice or snow 14 in order for the vehicle traction track 10 to be placed under the wheel. The lower ridged broadside of the member 16 is placed on the surface of the snow or ice 14.

As the wheel 12 is rotated, generally under power, the tire rotates against the abrasive broadside surface of the tongue 18 causing the smooth lower broadside of the tongue to slip and be pulled under the wheel 12 as illustrated in FIG. 5. If the elongated member 16 portion of the vehicle traction track 10 was also smooth on the lower broadside, the track 10 would be pulled completely through by the wheel and not remain between the wheel and the slippery surface. However, due to the ridges 22, the grippers 24 embedded therein and the weight of the wheel and the car, the grippers 24 are forced into engagement with the slippery surface 14 as illustrated in FIG. 6. Thus, despite continued rotation of the wheel 12, the track 10 will remain stationary allowing the wheel to rotate first along the upper abrasive broadside surface of the tongue 18 along the upper abrasive broadside surface of the elongated member 16 freeing itself from the hole or depression in which the wheel was lodged.

Once the vehicle was moved off the track, the track 10 can be removed from the slippery surface by lifting the tongue 18 and pulling the track 10 free of the slippery surface 14. The smooth lower surface of the tongue, not being embedded in the slippery surface provides a convenient means to lift the track thereby avoiding the need of a shovel or some other means to remove the track from a slippery surface.

Typical construction details of a preferred embodiment of the vehicle traction track 10 would be as follows: The body of the elongated member 16, the tongue 18 and the ridges 22, are integrally molded with a flexible rubber material having a plurality of cords, such as found in tire construction, spaced within the rubber and extending in the direction of elongation. The abrasive means 20 may be large-grain sharp sand or other abrasive particles which are partially embedded in the broadside surface. The length of the tongue 18 is approximately 50 percent of the total length of the vehicle traction track 10 to provide the desired ease of use. The ridges 22, which are parallel to each other and extend transversely to the elongated dimension of the track, may be two inches in width and have a pitch length of four inches.

There has been described, a vehicle traction track 10 having a rough, abrasive-covered upper broadside surface 20, and a plurality of spaced apart parallel ridges 22 extending transversely to the length of the track along a portion of the lower broadside surface. Contiguous to the upper surface and extending away therefrom in the direction of length is a tapered tongue 18 which is pulled between the wheel and the slippery surface by rotation of the wheel. A plurality of grippers 22 embedded in the ridges provide additional gripping means to secure the track to the slippery surface allowing the wheel to roll thereon.

What is claimed is:

1. A vehicle traction track for providing a traction surface between a vehicle driving wheel and a slippery surface, said traction track comprising:

An elongated flexible member having a pair of spaced broadsides,

Abrasive means fixedly attached to one of said broadsides and extending the length and breadth thereof, A plurality of ridges along said other broadside, said ridges equally and parallely disposed and extending transversely to the direction of length of said elongated member, A plurality of spaced apart metallic grippers embedded into and extending away from each of said ridges, and An elongated tappered flexible member having a pair of spaced broadsides extending in the direction of length from one end of said elongated member, one broadside of said tapered member having abrasive means attached thereto and lying in the same plane with said one broadside of said elongated member forming a continuous surface therewith and the other broadside of said tapered member being a smooth surface, Whereby said smooth surface of said tapered member permitting the traction track to be pulled under the vehicle wheel until said grippers are embedded in the slippery surface and the driving wheel moves along said abrasive continuous surface.

* * * * *